United States Patent

[11] 3,590,884

| [72] | Inventor | Clarence H. Helbing |
| | | Shelbyville, Ind. |
| [21] | Appl. No. | 783,273 |
| [22] | Filed | Dec. 12, 1968 |
| [45] | Patented | July 6, 1971 |
| [73] | Assignee | PPG Industries, Inc. |
| | | Pittsburgh, Pa. |

[54] EVEN WIRE WRAP FOR FLEXIBLE DUCT CONSTRUCTION
4 Claims, 4 Drawing Figs.

[52] U.S. Cl.................................................. 140/92.1,
72/135, 72/478, 72/482
[51] Int. Cl..................................................... B21f 3/00,
B21f 3/02
[50] Field of Search........................................... 72/135,
142, 144, 145, 478, 482; 140/71.5, 92.1, 92.2, 93;
138/129, 139; 242/50

[56] References Cited
UNITED STATES PATENTS

| 359,205 | 3/1887 | Curtis et al. | 140/92.2 |
| 605,170 | 12/1949 | Fraser et al. | 140/92.2 |
| 3,216,459 | 11/1965 | Schroeder et al. | 138/139 |
| 3,240,643 | 3/1966 | Schroeder et al. | 140/92.2 |
| 3,474,529 | 10/1969 | Lightner et al. | 140/92.1 |
| 3,502,114 | 3/1970 | Hay | 138/129 |

*Primary Examiner*—Charles W. Lanham
*Assistant Examiner*—E. M. Combs
*Attorney*—Chisholm and Spencer

ABSTRACT: As assembly for fabricating flexible insulated duct on a mandrel wherein wire is wrapped about the mandrel and onto a connector member, and in which the mandrel is provided with means coacting with an edge of the connector member to prevent wire from building up in successive side-by-side and/or overlapping wraps before being wrapped onto the connector member.

PATENTED JUL 6 1971

3,590,884

INVENTOR
CLARENCE H. HELBING
BY
Chisholm and Spencer
ATTORNEYS

EVEN WIRE WRAP FOR FLEXIBLE DUCT CONSTRUCTION

BACKGROUND OF THE INVENTION

This invention relates to the fabrication of flexible insulated duct for the conduction of gaseous fluids in commercial or residential heating and/or air-conditioning systems. More specifically, the present invention relates to the fabrication of flexible insulated duct comprised of a helically wound wire wrapped with porous insulating material encased in a flexible fluid-impermeable sleeve and terminated with sheet metal connectors.

One preferred method of manufacturing duct of the type described above is disclosed in U.S. Pat. No. 3,502,114, to Malcolm Hay, Jr. In accordance with that disclosure, fabrication of the duct proceeds by mounting a female connector and a male connector at spaced locations on a collapsible mandrel. An end of the wire forming the wire helix is then affixed to the female connector member and the wire is helically wound around a length of the connector along the length of the mandrel and around a length of the male connector member. During winding, an adhesive coating is continuously applied all along the length of the wire forming the helix. Upon reaching the desired length, the wire is terminated and the free end is affixed to the male connector member.

A blanket of insulating material is next sprayed with an adhesive that covers a sufficient portion of one surface thereof to provide at least one circumferential wrap around the wire helix. The insulating blanket is then wrapped convolutely or circumferentially around the wire helix and the connectors so that the adhesive coated surface faces the interior of the duct. Preferably, the insulating blanket covers substantially all of the female connector and only a portion of the male connector. After wrapping, the trailing end of the insulating blanket is preferably secured in place by means of staples. An outer sleeve of flexible, fluid-impermeable material is then pulled over the insulating blanket and the mandrel is collapsed to release the finished section of duct.

In manufacturing duct in accordance with the above method, considerable difficulty has been encountered in wrapping the wire from the mandrel onto the male connector member. Due to the fact that the male connector member has an inside diameter that is less than the inside diameter of the female connector, it is impossible to frictionally hold both connectors on a mandrel having a uniform diameter throughout its length. Accordingly, the outside diameter of the surface of the mandrel is stepped down at one end to accommodate mounting the male connector around this stepped-down surface portion of the mandrel. Preferably, this stepdown is equal to or slightly greater than the thickness of the sheet metal from which the connectors are made, so that the outer surface of the male connector is essentially coplanar with the outer surface of the remaining or stepped-up surface portion of the mandrel.

However, it has been found that wear and slight tolerance deviations along this stepped-down portion accumulate with tolerance deviations in the inside diameter of male connectors, to cause some male connectors to reside loosely on the mandrel. When this occurs, there is a tendency during winding the helix for the male connector to move away from the perpendicular wall formed between the stepped-down portion of the mandrel and the adjacent larger diameter or stepped-up portion of the mandrel. This movement leaves an annular groove between the connector and the mandrel, in which the wire can be caught during winding. Catching the wire in this groove will generally cause a number of turns of wire to be laid down side-by-side and/or in overlapping relation on the stepped-down portion of the mandrel before the wire jumps up onto the male connector. In the final duct, these side-by-side and/or overlapping wires are undesirable, because they tend to come loose from the insulating blanket and reside askance in the interior of the duct. In this position, these loose wires can adversely affect the fluid flow through the duct and provide locii for buildup of duct-clogging materials. Moreover, these loosened wires can affect the structural integrity of the duct. Also, since these wires serve no useful purpose, their presence merely adds to the cost of each duct section fabricated.

The present invention is directed towards eliminating the foregoing problems. In particular, the present invention provides the mandrel with coupling engagement means that assures an evenly spaced wrap of wire will be maintained as wire is wrapped from the mandrel onto the connector member.

The foregoing and other objects, features and advantages of this invention will become more apparent when considered in connection with the accompanying drawing, in which.

Figure 1:
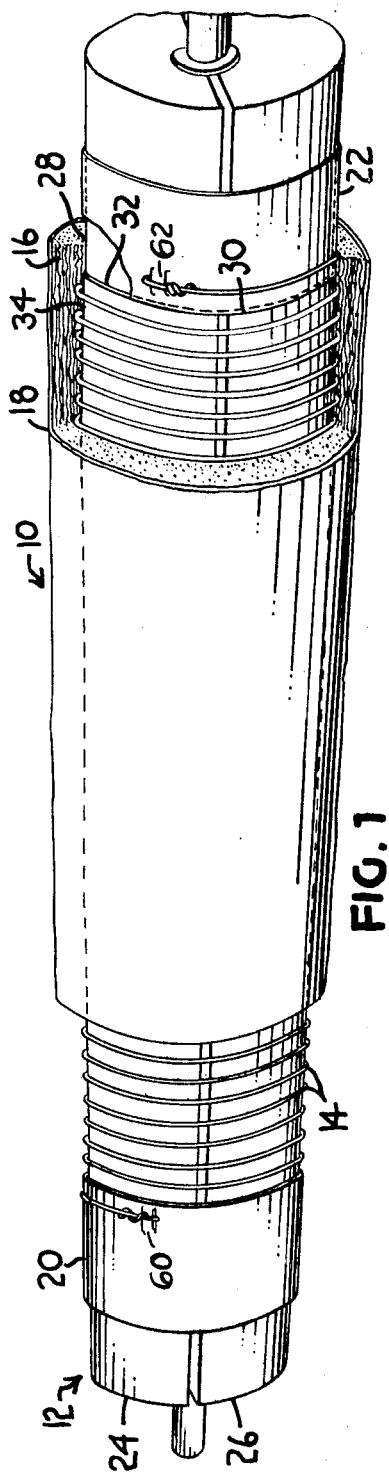
FIG. 1 is a perspective view, partly broken away, of a short section of flexible insulated duct mounted on a collapsible mandrel.

Shown in FIG. 1 is a perspective view, partly broken away, of a flexible insulated duct 10 mounted on a collapsible mandrel assembly 12. As shown, duct 10 is comprised of a helically wound wire 14 wrapped with porous insulating material 16 encased in a flexible, fluid-impermeable sleeve 18 and terminated with a female connector member 20 and a male connector member 22.

As illustrated in FIG. 1, duct 10 is fabricated on a collapsible mandrel assembly 12 comprised of a pair of semicylindrical mandrel halves 24 and 26 that are adapted to expand away from each other for fabrication of the duct and to collapse radially towards each other to facilitate the removal of the completed duct from the assembly. Not shown are means for supporting and rotatably driving the mandrel 12, nor means for supporting a wire-feeding assembly and an adhesive applicator assembly and moving them longitudinally along the mandrel assembly 12 in synchronization with the rotation of the mandrel assembly for feeding adhesive-coated wire onto the mandrel assembly in a continuous helix. For schematic details of the apparatus not shown, reference may be had to U.S. Pat. No. 3,216,459, assigned to the assignee of the present invention.

As shown in FIG. 1, female connector member 20 is mounted during fabrication of the duct around one end of the mandrel assembly 12 and is frictionally supported in place thereabout by the expanded mandrel halves 24 and 26. Also as shown, the male connector member 22 is similarly mounted on the other end of the mandrel assembly, except that the male connector 22 resides on a stepped-down surface portion 28 of the mandrel assembly with the interior edge 30 of connector 22 abutting the perpendicular wall 32 formed between the stepped-down surface portion 28 and the elongated stepped-up surface portion 34, upon which the female connector 20 is mounted and the wire 14 is wrapped. The drawings illustrate means 60 and 62 for affixing the wire 14 on the connecting members 20 and 22 respectively. The specific means illustrated are for example only and any suitable means may be used.

As mentioned hereinabove, the present invention is concerned with the male connector moving to the right, as viewed in FIG. 1, such that an annular groove is presented between edge 30 of connector 22, wall 32 and stepped-down surface portion 28 of the mandrel assembly. When this last-mentioned condition exists, it is possible for the wire 14 to catch in this groove and cause a number of turns of wire to be wrapped side-by-side and/or in overlapping relation before the wire jumps onto the connector 22.

Figure 2:
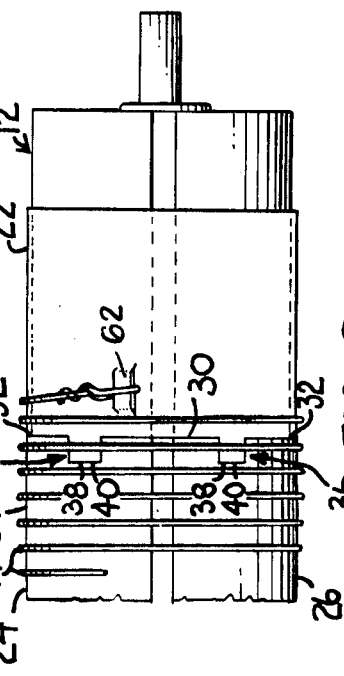
FIG. 2 is a view showing details of one preferred embodiment of this invention.

One preferred means for obviating the foregoing is shown in FIG. 2. In this embodiment of the present invention, a spline-type connection 36 is provided between edge 30 of connector 22 and the stepped-up surface portion 34 of mandrel assembly 12. For this purpose, as shown, rectangular tabs or projections 38 are provided at spaced locations along the edge 30 of connector 22, and these tabs are received in corresponding slots 40 in perpendicular wall 32 and stepped-up surface portion 34 of mandrel assembly 12. Accordingly, should connector 22 move to the right, as shown, tabs 38 provide a bridge between perpendicular wall 32 and edge 30 of connector 22 to prevent wires from being caught and wrapped therebetween. Experience has shown that, for the relatively small longitudinal movement of connector 22 that is generally involved, a tab and slot interengagement of about ¼—½ inch is adequate for most purposes.

Figure 3:
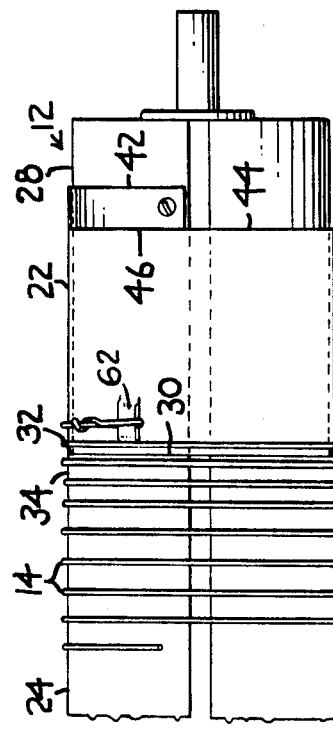
FIG. 3 is a view showing details of a second preferred embodiment of this invention.

Shown in FIG. 3 is an alternate preferred embodiment of this invention. In this embodiment, as shown, in lieu of using a spline-type connection between connector 22 and mandrel assembly 12, an arcuate collar 42 is affixed to the stepped-down surface portion 28. Collar 42 is affixed so that when connector 22 is mounted with edge 30 thereof abutting perpendicular wall 32, the exterior or opposite edge 44 of connector 22 abuts or is spaced only a slight distance from the adjacent edge 46 of collar 42. Where, for clearance purposes, a slight space is provided between edge 46 of collar 42 and edge 44 of connector 22, this space is less than the diameter of wire 14. Accordingly, collar 42 provides means carried on the mandrel assembly 12 coacting with the adjacent edge 44 of connector 22 to maintain an even spacing of wire 14 as wire 14 is wound from the mandrel assembly 12 onto connector member 22.

Figure 4:
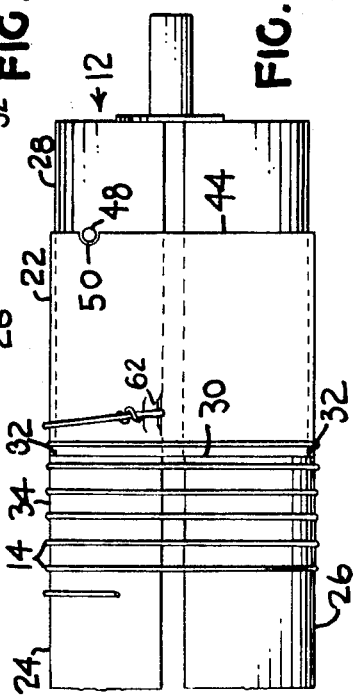
FIG. 4 is a view showing details of a third preferred embodiment of this invention.

Shown in FIG. 4 is a further embodiment of this invention. In this embodiment, as shown, a short, cylindrical pin 48 or the like projects from the stepped-down surface portion 28 of the mandrel assembly 12 and is received in a correspondingly sized semicylindrical groove 50 in the exterior edge 44 of connector 22. As mentioned in connection with FIG. 3, where, for clearance purposes, it is desired to provide a slight space between pin 48 and groove 50 when interior edge 30 of connector 22 abuts perpendicular wall 32 of mandrel assembly 12, this space is less than the diameter of wire 14. Moreover, as will be apparent, pin 48 can function in the manner of the spline-type connection of FIG. 1, in that both not only restrict longitudinal movement of connector 22 but also prevent connector 22 from rotating on the mandrel assembly. Also, as with each of the preceding embodiments of this invention, pin 48 provides a means carried on the mandrel assembly 12 coacting with an edge of the connector 22 to prevent wire from being wound from the stepped-up surface portion 34 of the mandrel assembly onto the stepped-down surface portion 28 thereof.

It will be apparent from the foregoing that the present invention provides a relatively simple yet efficient means to overcome all of the prior art problems that resulted from building up a number of side-by-side and/or overlapping turns of wire as wire was wrapped from a mandrel onto a male connector member in the fabrication of flexible insulated duct.

While the preferred embodiments of this invention have been illustrated and described, it will be understood that various changes and modifications may be made within the scope of the appended claims without departing from the spirit of the invention.

I claim:

1. An assembly for use in the fabrication of flexible insulated duct, comprising a mandrel having an elongated surface portion with a concentrically disposed, stepped-down surface portion at one end forming a wall therebetween, a connector member mounted on said stepped-down surface portion, means carried on said mandrel and coacting with an edge of said connector member to prevent wire from being wound from said elongated surface portion onto said stepped-down surface portion of the mandrel and between said wall and said connector member before being wound onto said connector member, and means for affixing said wire on said connector member.

2. The assembly of claim 1 wherein said means carried on said mandrel comprises a plurality of slots in said elongated surface portion thereof, and said slots coact with tabs provided at spaced locations along an edge of said connector member to provide a spline-type connection between said mandrel and said connector member.

3. The assembly of claim 1 wherein said means carried on said mandrel comprises an arcuate member affixed to said mandrel and projecting above said stepped-down surface portion thereof, and said arcuate member coacts with the edge of said connector member disposed nearest the adjacent end of said mandrel to thereby restrict longitudinal movement of said connector member on said mandrel.

4. The assembly of claim 1 wherein said means carried on said mandrel comprises a pin affixed to said mandrel and projecting above said stepped-down surface portion thereof, and said pin coacts with a groove in the edge of said connector member disposed nearest the adjacent end of said mandrel to thereby restrict both longitudinal movement and relative rotational movement of said connector member on said mandrel.